(12) United States Patent
Cuny et al.

(10) Patent No.: US 7,023,305 B2
(45) Date of Patent: Apr. 4, 2006

(54) CONTROL AND PROTECTION MODULE OF A SWITCH DEVICE

(75) Inventors: Jean-Christophe Cuny, Rueil-Malmaison (FR); Philippe Guibert, Chatou (FR); Gilles Baurand, Montesson la Borde (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 10/490,732

(22) PCT Filed: Oct. 30, 2002

(86) PCT No.: PCT/FR02/03729

§ 371 (c)(1),
(2), (4) Date: Apr. 8, 2004

(87) PCT Pub. No.: WO03/043156

PCT Pub. Date: May 22, 2003

(65) Prior Publication Data

US 2004/0257741 A1 Dec. 23, 2004

(30) Foreign Application Priority Data

Nov. 16, 2001 (FR) .................................. 01 14879

(51) Int. Cl.
*H01H 67/02* (2006.01)
(52) U.S. Cl. ...................... 335/132; 335/202; 361/93.1
(58) Field of Classification Search .................... 335/6, 335/132, 202; 361/42–51, 93; 324/536
See application file for complete search history.

(56) References Cited

U.S. PATENT DOCUMENTS

| 5,606,299 A * | 2/1997 | Innes et al. ................. 335/202 |
| 5,774,319 A | 6/1998 | Carter et al. |
| 6,426,634 B1 * | 7/2002 | Clunn et al. ................ 324/536 |
| 2002/0130742 A1 * | 9/2002 | Jacq et al. ................... 335/132 |
| 2003/0202305 A1 * | 10/2003 | Engel et al. ............... 361/93.8 |

FOREIGN PATENT DOCUMENTS

WO 0127958 4/2001

* cited by examiner

*Primary Examiner*—Lincoln Donovan
(74) *Attorney, Agent, or Firm*—Oblon, Spivak, McClelland, Maier & Neustadt, P.C.

(57) ABSTRACT

The invention concerns a control and protection module (10) for a low voltage multipolar switch device that is comprised of a connector base (50), a control electromagnet (41) and a trip mechanism (42) capable of acting upon the moving contacts (52) in order to open and break the power poles. The detachable control and protection unit (10), an electronic board (20) which has a processing unit (30), a control device (31) and a protection device (32), responsible respectively for operating the electromagnet and the trip mechanism in response respectively to a control signal (310) and a trip signal (320) transmitted by the processing unit (30). The processing unit can suppress the control signal (310) from the electromagnet (41) in the event of malfunction of the protection device (32).

20 Claims, 2 Drawing Sheets

CONTROL AND PROTECTION MODULE OF A SWITCH DEVICE

CROSS-REFERENCE TO RELATED APPLICATIONS

This application is a national stage application of PCT application PCT/FR02/03729 filed on Nov. 30, 2002, and claims priority to French application no. 01 14879, filed Nov. 16, 2001.

BACKGROUND OF THE INVENTION

1. Field of the Invention

The present invention concerns a control and protection module for a low voltage electric switch device, such as a contactor-breaker. This control and protection module governs the control of an electromagnet and tripping device which are capable of opening and closing the power poles of the electric switch device. The invention also concerns an electric switch device that may be connected to such a control and protection module.

2. Description of Related Art

A contactor-breaker is a multipolar electric device used for controlling and protecting an electric charge such as a motor. The contactor-breaker can control the feed and cut-off of the power leads linked to the charge, by means of a control electromagnet attached to the "contactor" part. By way of an electromagnetic trip mechanism, it also cuts off the power leads automatically when an electrical fault occurs in at least one of the leads, such as a thermal overload, a magnetic overload or a short circuit.

In such a device, the power poles have stationary and moving contacts within the cut-off areas. The control electromagnet prompts a multipolar component to act upon the moving contacts in order open or break the power leads in response in response to a command from a control model. The trip device also prompts the multipolar component to act upon the moving contacts in order to open the power poles in response to the detection of an electric fault coming from a protection device. The trip device can be reset by a manual control component that can also prompt the multipolar component to ensure the opening of the moving contacts.

The document EP 366 519 describes such a contactor breaker of the type referred to above. The protection device is essentially mechanical, because it needs to work with a large number of devices and a wide range of voltages and power currents. In document FR 2 759 489, the electromagnet of a contactor-breaker carries out the switching of the contacts in both contactor and breaker mode. The hybrid way in which the electromagnet functions and the high speed of control necessary in breaker mode is problematic.

The document WO 01/27958 describes a contactor-breaker whose power leads, fixed and moving contacts, control electromagnet and the trip device are housed in a connector base of the device. The connector base is connected to an electronic control and protection device which has the advantage of being a detachable module interchangeably linked to the connector base. This arrangement allows, for the same base, to receive different ratings of protection modules, hence reducing the different combinations necessary for covering a whole range of products. Furthermore, this arrangement allows the user to customize the contactor-breaker at the last moment, after cabling the power section.

However, in this type of switch, operational safety must be permanently guaranteed by the different control and protection units. This is why the main aim of this invention is to increase the operational safety of a contactor-breaker by putting in place servo-devices between the control of the electromagnet and the control of the trip magnet offering a redundancy of safety functions because of the use of electronic, central processing means for driving and controlling both the electromagnet and the trip device.

BRIEF SUMMARY OF THE INVENTION

Therefore, the invention describes a low voltage control and protection module designed to control and protect an electric charge. The switching device consists of a connector base which integrates current lines that have stationary and moving contacts, a control electromagnet, and a trip device capable of acting upon the said moving contacts to open and break the power poles. The control and protection unit, located inside a box and attached in a detachable way to the connector base, accommodates current sensors measuring the strength of the current crossing the said current lines and an electronic board bearing a processing unit, with an electronic control device and an electronic protection device, responsible respectively for operating, by way of a control terminal block, the control electromagnet and the trip mechanism, in response respectively to a control signal and a trip signal transmitted by the processing unit. The module is characterised by the fact that the processing unit can disable the electromagnet control signal in the event of malfunction of the protection device.

The electronic protection device has energy storing means enabling the storage of electric energy at least equal to a sufficient level in order to operate the trip mechanism. According to one feature, the processing unit disables the electromagnet control signal when electric energy stored in the storage means is below said level. The processing unit also disables the electromagnet control signal when a connection fault is detected between the electronic protection device and the trip device.

Also, the invention has the aim of optimising the arrangement of such a contactor-breaker, simplifying the placement of the protection module, making it easier for users to control, minimising the number of components used in its manufacture and making connections between the base unit and the protection model more reliable.

According to another feature, the electronic board is set out in such a way as to directly accommodate the current sensors, the control terminal block and the operator communication means situated on a front side of the casing. These operator communication means include a unit which selects a unique setting parameter and the processing unit has calculation means to determine, by way of said setting parameter, a threshold trip value in the event of a thermal overload and in the event of a magnetic fault.

The invention also concerns a multipolar switching device designed to control and protect an electronic charge, comprised of a base unit accommodating current lines fitted with fixed and moving contacts, a control electromagnet and a trip mechanism capable of acting upon the said moving contacts. The electric device is characterised by the fact that the connector base may be attached to such a control and protection module in a detachable way.

BRIEF DESCRIPTIONS OF THE SEVERAL VIEWS OF THE DRAWINGS

Other features and advantages will be stated in the detailed description which follows with reference to an embodiment given by way of example and represented by the attached drawings in which.

DETAILED DESCRIPTION OF THE INVENTION

Figure 2:
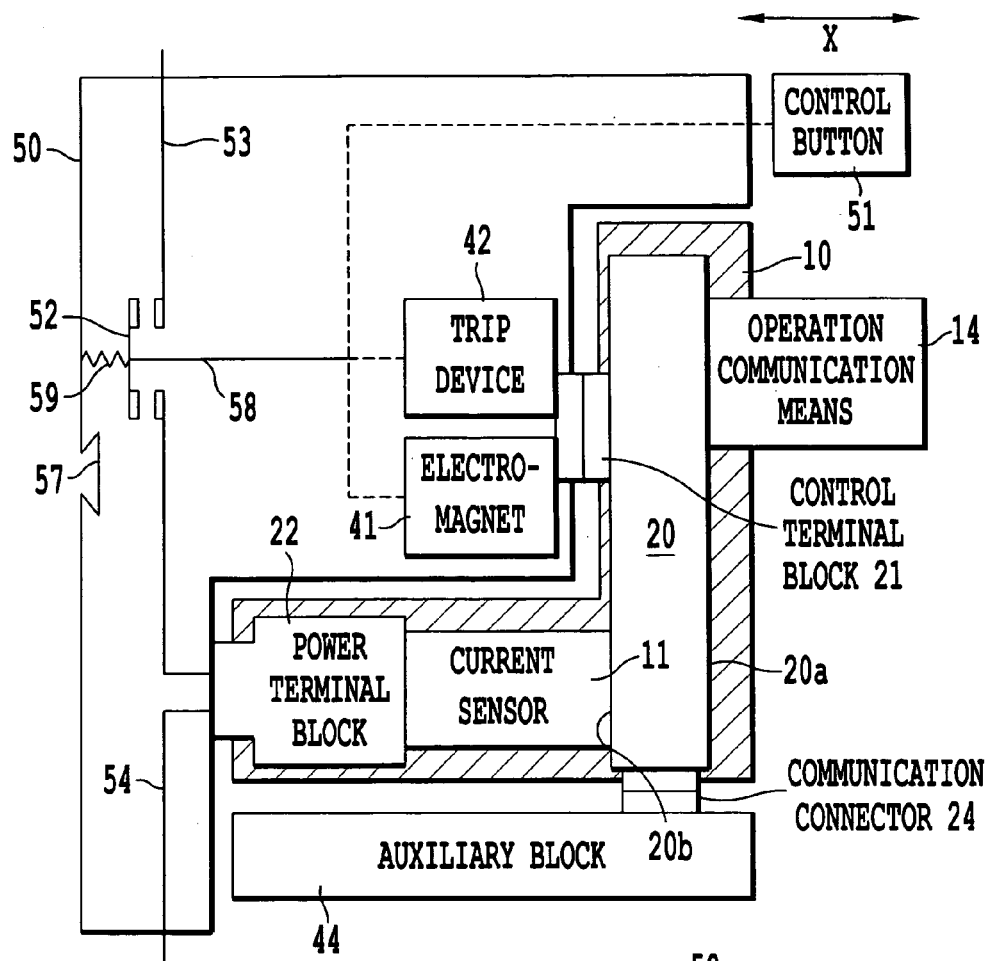
FIG. 2 shows a simplified structure of a control and protection model mounted on the connector base of a switch device.

FIG. 2 shows a multipolar switch device of contactor-breaker type, current reverser or starter contactor-breaker, comprised of a base unit 50, to which one can electrically attach an interchangeable and detachable control and protection module 10. The base unit 50 has traditional fixing means in its rear section such as a standardised rail or a carrier mounting plate, and accommodates power poles with stationary supply side and load side contacts between moving contacts 52. The fixed supply side contacts are connected to load side current lines 53 (source lines) which establish the electric continuity between the electric network and the poles of the switch device. The fixed supply side contacts are connected to load side current lines 54 (charge lines) which establish the electrical continuity between the poles of the switch device and an electric charge, generally an electric motor, that may be controlled and protected with the switch device. The fixed and moving contacts are situated at the rear of the device, as indicated in FIG. 2. A power terminal block 22 is located on the load side current lines 54. This power terminal block 22 connects the current sensors 11, 12, 13, of the control and protection module 10, which measure the current circulating in the various power poles.

The moving contacts 52 are said to be in their open position when they are disconnected from the stationary contacts thus opening the power poles. They are said to be in closed position when they are connected to the fixed contacts thus breaking the power poles and enabling the passage of current in the electric charge, subject to the continuity of the current in the power terminal block 22. FIG. 2 shows the moving contacts in their open position.

For each pole the moving contacts 52 are placed on a moving bridge that is prompted on opening by the movement of a press rod 58, and on breakage by a spring 59, when the press rod 58 is freed, thus giving an action generally known as "breaking pole". Different units work together mechanically to cause the press rod 58 to move in the direction for opening and closing the mobile contacts, by means of traditional mechanical connections, the detail of which is not shown in these figures. These different elements which belong to the connector base 50, are a control electromagnet 41, a trip electromagnet 42 and a manual control button 51. In known fashion, the trip electromagnet 42 and the manual control button 51 acts upon the moving contacts by way of a switch.

The control electromagnet 41 is a mono stable type and has a coil into which feeds a direct current. This electromagnet controls the closure of the mobile contacts 52 when a current circulates in the coil and the opening of the mobile contacts 52 when there is no current circulating. The trip electromagnetic 42 is a bistable type with a quick action and, when a current circulates in its coil it triggers the opening of the moving contacts 52 regardless of the state of the electromagnet 41.

The manual control button 51 is located on a front side of the connector base 50, so as to be easily accessible to a user when the switch device is functioning. The button 51 may be put into an "ON" position and an "OFF" position. The OFF position forces the opening of the moving contacts 52 and puts the switch device into isolation mode. Moving from the OFF position to the ON position brings about reengagement of the trip device 42, hence the closure of moving contacts 52 being conditioned by an appropriate instruction from the electromagnet 41. The button 51 may also be set to a third "trip" position which is obtained by the operation of the trip device 42, signalling the occurrence of a thermal or magnetic fault.

The control and protection module 10 is interchangeable and detachable from the connector base 50. It has a casing which favourably has a parallelepiped shape with a vertical section in the shape of an "L". The casing contains the current sensors 11,12,13 responsible for measuring the strength of the current circulating in the load side current lines 54, an electronic board 20 and operator communication means 14 situated on the front side of the casing, so as to be easily accessible to the operator.

Figure 1:
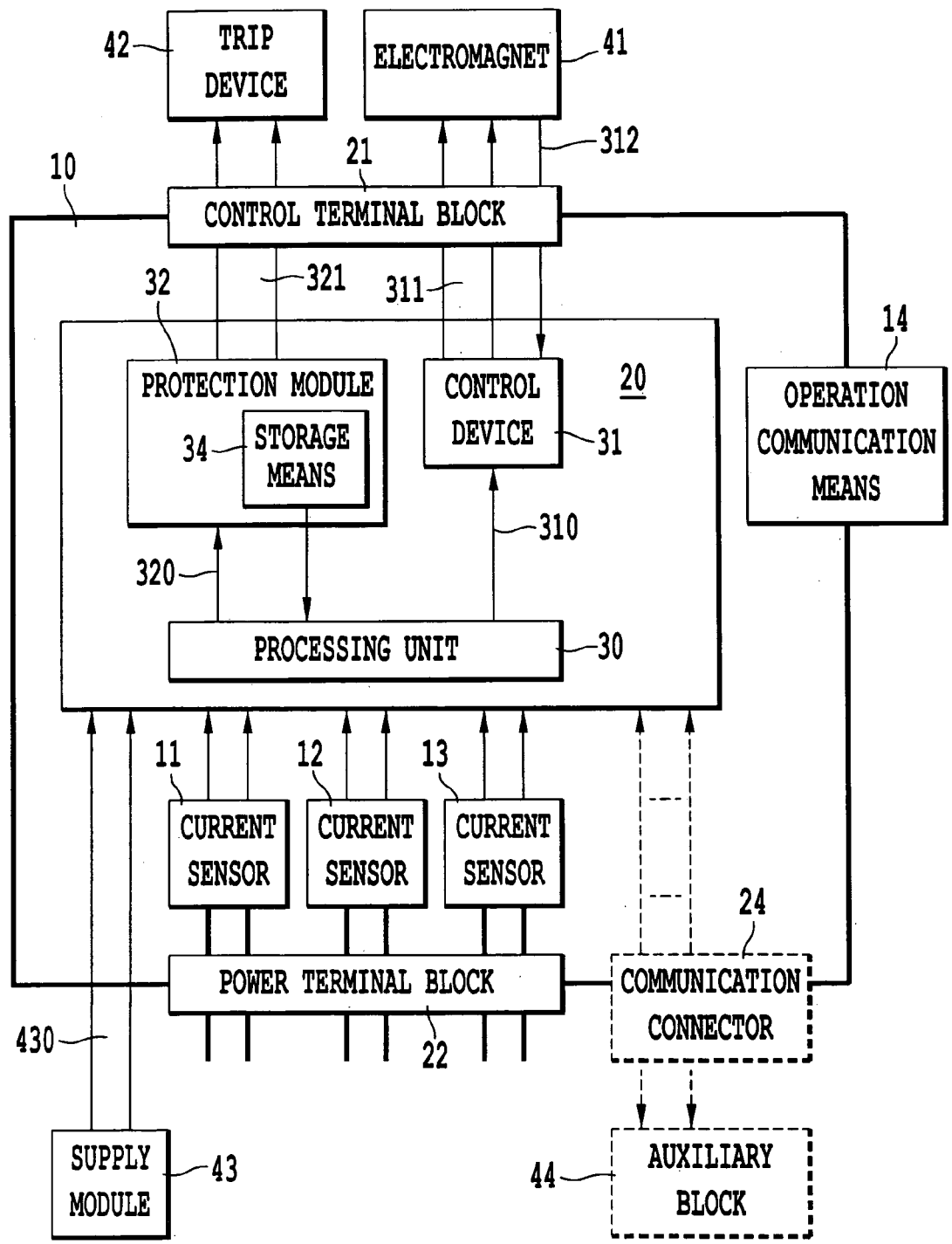
FIG. 1 represents a functional diagram of a control and protection module as per the invention.

According to the invention and in reference to FIG. 1, the electronic board 20 of the control and protection unit 10 contains a central processing unit 30 connected to an electronic protection device 32. The electronic control device 31 is connected to the control electromagnet 41 by a polarised two-wire connection 311 and the electronic protection device 32 is connected to the trip device also by a polarised two-wire connector. The electronic card 20 receives an electric supply signal 430 coming from a supply module 43. In a simplified embodiment, this signal 430 may be confused with the OFF/ON order (A1,A2) used for controlling the electromagnet 41. In another embodiment the OFF/ON order of the electromagnet is provided separately in a logical form or via a communication network.

The electronic control device 31 is responsible for operating the control electromagnet 41 in response to a control signal 310 from the electromagnet sent by the processing unit 30. To do this, it does the following: on receiving the control signal 310, the control device 31 assesses the level of voltage available in the order of ON/OFF received. If this voltage level is greater than a level termed "climb voltage" it communicates to the electromagnet 41 the energy necessary for its climb (call energy) by the connection 311, hence bringing about the closure of the moving contacts 52, then it sends the required amount of energy for its maintenance (maintenance energy which is generally less that the call energy). When the control signal disappears the control device 31 controls the descent of the electromagnet 41 by suppressing the energy. For safety reasons, the system described has the advantage that, because the electromagnet is monostable, a disconnection or cut-off of the supply from the control and protection module 10 brings about the automatic descent of the electromagnet 41. As detailed below, the control signal 310 from electromagnet 41 is only sent after it has checked that there was enough energy necessary for the operation of the trip device.

According to an advantageous embodiment, the electronic control device 31 may receive from the connector base 50 an identification signal 312 from the electromagnet 41. This identification signal 312 enables the electronic control device 31 to recognise the type of electromagnet present in the connector base 50. In the example described two types of electromagnet may be inserted into the connector unit 50 depending on the rating of the switching device. Both these types of electromagnet function with a coil supplied with a direct current, 24 Volts for example, but whose electric consumption levels are different. The first type of electromagnet coil consumes approximately 200 mA, whereas the second type of electromagnet coil only consumes 100 mA. This second type of electromagnet is essentially adapted to economically connect, without intermediary relaying, the switch device directly to an automation system such as a programmable automatic system, whose direct compact outputs of 24 volts cannot generally deliver more than 100 mA.

The electronic control module 31 is therefore capable of changing the value of the current circulating in the two-wire connector 311 to different values depending on the status of the identification signal 312. In an extremely simple embodiment, the identification signal 312 is comprised of a single conductor which is either connected to the "plus" terminal of the two-wire connector (for the second type of electromagnet with low electricity consumption), or not connected to any power terminal (for the first type of electromagnet). It is therefore easy for the control device 31 to test the presence of voltage in the identification signal 312 to set the strength of the current of the two-wire connector to the desired level.

The two-wire connector 321 for controlling the trip device 42, the two-wire connector for controlling the electromagnet and the identification signal 312 of the electromagnet 41 are transmitted between the base 50 and the electronic board 20 of the module 10 via a unique control terminal block 21 which is comprised of 5 connectors in the example shown. (pressure blade type as an example)

The electronic protection device 32 is responsible for operating the trip device 42 in response to a trip signal 320 sent by the processing unit 30. The trip signal 320 is generated when the processing unit 30 detects a fault situation in one or more power poles, such as a thermal fault, magnetic fault or short-circuit fault, based on information sent by the current sensors 11,12,13. To ensure the trip device 42 is triggered, the electronic protection device 32 has energy storing means enabling the storage of an amount of energy at least equal to a determined level which is enough to operate the trip device 41. These storage means 34 are for example formed of a capacity located on the electronic board that is responsible for the application of the voltage in the electronic board 20. On receipt of a trip signal 320 coming from the processing unit 30, the electric energy stored by this capacity is then sent by the electronic protection device 32 across the two-wire connection 321 so as to operate the trip device very quickly.

Thus, via a centralised processing unit 30, the control and protection module 10 is capable of operating two different actuators at the same time, acting on the power poles, that is to say on the trip switch 42 in the event of detection of a fault on the poles of the switch mechanism (circuit breaker function) and on the control electromagnet 41 to open or break the poles of the switch mechanism on a voluntary order (contactor function). According to a preferred embodiment, the processing unit 30 may be integrated into an ASIC component mounted on the electronic card 20.

However, to guarantee optimal functioning, it is necessary to check that the switch device is always capable of operating the trip device. This is why the processing unit 30 also carries out a monitoring function so as to constantly monitor the functioning of the electronic protection device 32. As soon as a malfunction is detected in the electronic protection module by this monitoring function, the processing unit 30 has the capacity to suppress the command signal 310 to ensure that the moving contacts 52 of the switch device open. A redundancy of the security function is thus created, since, due to its central processing unit 30, the control and protection module 10 of the switch device protects the electric charge from thermal faults, magnetic faults and short-circuiting by operating the trip device 42, and can also protect against an operating fault in the trip device 42 by being able to suppress the control signal 310 from the electromagnet 41.

Different malfunctions of the electronic protection module 32 are thus detectable by the control and protection module 10. In the preferred embodiment, you can permanently monitor that there is enough energy stored in the storage means 34 and that the electric connection between the protection device 32 and the trip device is correct.

For this, the monitoring function of the processing unit 30 is capable of measuring the electric energy stored in the storage means 34 so as to keep a permanent check that this energy is at least enough to operate the trip device 42. If there is not enough energy in the storage facility 34, this then means the switch device will not be able to operate the trip device 42 in the event of a thermal, magnetic fault, thus creating a potentially dangerous situation if the moving contacts 52 are closed.

The monitoring function of the processing unit 30 keeps a constant check that the electric connection between the control and protection module 10 and the trip device 21 is correct. For this, the module 10 is for example capable of generating a low amplitude signal circulating through the two-wire connection 312 by using a small current generator, this current being enough to test the loop of this two-wire connection 321 but not enough to operate the trip mechanism. If the two-wire connection 321 is not feeding (connection fault between the control and protection module 10 and the trip mechanism 42), this means that the switch device will not be able to operate the trip device 42 in the event of a thermal, magnetic fault, thus creating a potentially dangerous situation if the moving contacts 52 are closed.

In the two aforementioned malfunction events, due to the present invention, the processing unit 30 is capable of putting the switch device into a safe state, by suppressing the control signal 310 so that the electronic control device 31 halts the supply from the electromagnet 41 so as to open the moving contacts 52.

Furthermore, the processing unit 30 does not carry out any control of the electromagnet 41 by the control signal, without checking beforehand:
 the electronic energy stored in the storage means 34 is above or equal to a level required for operating the trip mechanism.
 the connection between the control and protection module 10 and the trip mechanism is effective.

The control and protection module 10 thus ensures a redundancy of the safety of the switch mechanism as it considerably diminishes the likelihood of having a switch device supplying a charge and unable to carry out its safety functions in the event of a thermal or magnetic fault or a short-circuit.

Thus, via a centralised processing unit 30, the control and protection module 10 can, in line with the function mode chosen, manage the occurrence of a thermal fault in one or several current lines. For example, when a thermal fault arises in automatic type function mode, the processing unit 30 is capable of suppressing uniquely the control signal 310 of the electromagnet 41 without sending the trip signal 320 from the trip device 42. After a predetermined amount of time, the conditions are again satisfied; the processing unit 30 may then automatically start sending the electromagnet control signal. This function mode is especially for the control of motors located remotely or difficult to access because it saves an operator having to intervene locally to manually reset/reengage switch devices when a simple thermal fault occurs. If the thermal fault reappears, the processing unit 30 may then of course operate the trip device 42.

Another aim of the invention concerns the simplification of the manufacture and the ease of working the control and protection module 10.

According to another feature, the electronic board is set out in the housing in such a way as to directly accommodate the current sensors 11,12,13, the control terminal block 21 and the operator communication means 14, without requiring other connections, such as electric wires. This provision thus simplifies assembly and makes the connections more reliable. In reference to FIG. 2, the electronic card 20 is placed in an absolutely vertical position in the switch device. It has a front side 20*a* towards the front of the switch of and a back side 20*b* towards the back of the switch device. The operation communication means 14 cross the housing so as to be accessible to an operator situated in front of the switch device and are attached directly, for example by soldering, to the front side 20*a* of the card. The control terminal block is attached, also by soldering, to the back side 20*b* of the card and crosses the casing and connects to the connector base 50.

The current sensors 11,12,13 are inserted precisely perpendicular to the electronic card 20, in a horizontal layout towards the back of the switch device. This provision minimises the risk of the current sensors heating the electronic card. At a front edge, each current sensor 11,12,13 is connected to the back side 20*b* of the electronic card 20, for example via two teeth soldered directly onto the card. At a rear edge, each current sensor 11,12,13 is linked in series by the common power terminal block 22 (formed of clips or plugs) at each pole of the load side current lines 54 of the switch device. Thus, when the control and protection module 10 is absent, the load side current lines 54 are opened at the level of the power terminal block 22 and the switch device is put into a safe, isolation type position The switch device may optionally receive an auxiliary block 44 positioned under the control and protection module 10, as indicated in FIG. 2. A communication connector 24 (for example a pressure blade type) crossing the housing is directly attached to the electronic board 20, and enables communication between the control and protection module 10 and the auxiliary block 44.

These different provisions advantageously simplify to the maximum, the connections between the electronic board 20 and its exterior environment by avoiding in particular any additional link requiring braids or electric wires.

The control and protection module 10 is interchangeable and detachable from the connector base 50 in a horizontal direction X from front to back. The power terminal block 22 and the control block 21 both face the back of the housing of the control and protection module 10 in the same direction X. When inserted they are linked to the complementary connections facing the front of the connector base 50. This positioning increases the reliability of the contacts and makes insertion of the module 10 easier since the effort of pressure for the connection is applied in the same direction as the effort for inserting the module 10. In addition, the invention anticipates that when the control and protection module is taken away, the control terminal block 21 is always disconnected before the power supply terminal 22 is disconnected, due in particular to the length of the plugs of power supply terminal 22. This gives an additional safety function, guaranteeing that the moving contacts 52 are definitely open before disconnection of the power supply terminal 22, to avoid any cut in power charge. As soon as the control terminal block 21 is disconnected, the control electromagnet 41 is no longer supplied with electricity, which brings about the opening of the moving contacts 52.

Figure 3:
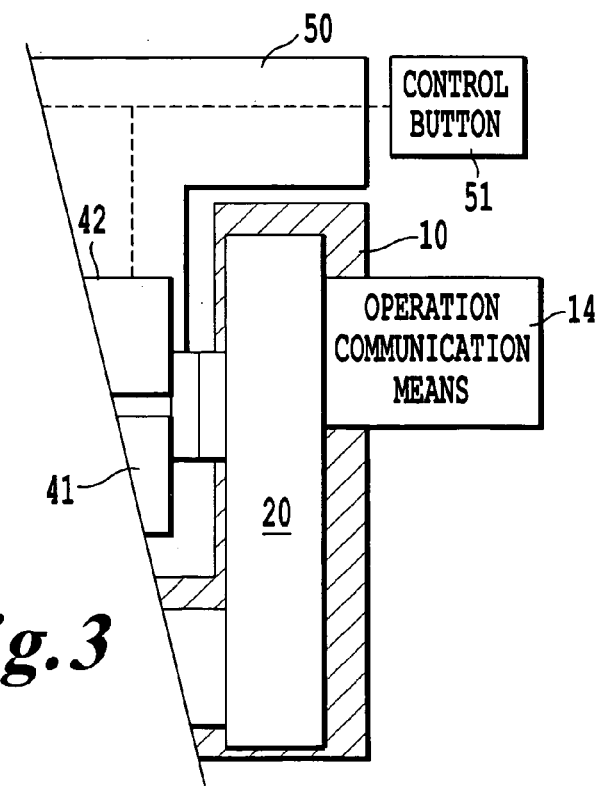
FIG. 3 is the same as FIG. 2 except that the manual control button is in another position.

The manual control button 51 is laid out in such a way that when it is in its Off position, as shown in FIG. 2 it does not hinder the extraction and insertion of the control and protection module 10 in the connector base 50. However, when the manual control button 51 is in its ON position, as shown in FIG. 3 it covers the top of the control and protection module therefore preventing any untimely removal of the control and protection module, thus providing an additional safety function.

To make the switch device operate quickly, the operator dialog facility 14 includes a code wheel type of selection element, a potentiometer or equivalent, which is accessible to the operator, located on the front side of the housing Advantageously, this unit enables the operator to choose the unique/single setting parameter value $I_R$, readable on the front side of the housing. According to the invention, the processing unit 30 also has a calculation facility for determining, based on this chosen $I_R$ value, the values used as the thermal fault trip threshold and a magnetic fault trip threshold. The operator can easily choose the setting parameter value $I_R$ as it usually corresponds to the nominal current plated on the motor. It varies between a minimum value $I_{Rmin}$ et a maximum value $I_{Rmax}$ predetermined in the control and protection module 10 in accordance with its rating.

When one of the stator currents of the motor measured by the current sensors 11, 12, 13 exceeds the threshold of approximately 15 times the maximum value, $I_{Rmax}$, then the processing unit 30 of the module 10 instantly detects a short-circuit fault. When one of the stator currents of the motor exceeds the threshold of approximately 15 times the maximum value, $I_R$ for a period of time in the order of 100 ms, then the processing unit 30 detects a magnetic overload type of fault. In order to detect a thermal overload type fault—traditionally detected using bimetallic strips—the processing unit 30 works out and stores, using stator current measurements of the motor, a thermal state proportional to the square of the current in the phases and representative of the thermal state of the motor that requires protection, in proportion to the nominal current $I_R$ set by the operator. A thermal fault is detected by the processing unit 30 of the module 10 when the stator currents measured are not equal or when the cumulative thermal state exceeds a value which is determined by a traditional protection curve which gives the trip time in proportion to the current, and which is stored in the processing unit 30. Various other types of thermal protection may be selected at the electronic card level 20, when the model 10 is assembled. (protection categories, motor types).

The operator communication facility 14 may also have a test button on the front side of the housing which allows the operator to simulate the occurrence of a thermal fault, by artificially changing the thermal state of the motor. For certain versions, more sophisticated operator communication means 14 are envisaged, capable of visualising complimentary information by offering in particular a small screen on the front side of the housing.

It is understood that it is possible, without going beyond the scope of invention, to imagine other variations and final touches and even foresee the use of equivalent means.

What is claimed is:

1. A control and protection module for a low voltage multipolar switch device, designed to control and protect an electric charge, said switch device comprising a connector base fitted with current lines that have stationary and moving contacts, a control electromagnet and a trip device capable of acting on said moving contacts in order to open or break the power poles, the control and protection module comprising, in a housing attached in a detachable way to the connector base:
   current sensors which measure the strength of the current crossing said current lines,
   an electronic board that has a processing unit, and includes an electronic control device and an electronic protection device, responsible respectively for operating, by way of a control terminal block, the control electromagnet and the trip mechanism in response respectively to a control signal and a trip signal transmitted by the processing unit, wherein:
   the processing unit is configured to suppress the electromagnet control signal in the event of malfunction of the protection device.

2. The control and protection module according to claim 1, wherein:
   the electronic protection device comprises energy storage means enabling the storage of electric energy at least equal to a level required for operating the trip mechanism, and
   the processing unit is configured to suppress the control signal from the electromagnet when the electrical energy stored in the storage means is less that said level.

3. The control and protection module according to claim 2, wherein:
   the processing unit is configured to check that the electric energy stored in the storage means is greater than or equal to said level required for operating the trip mechanism, before sending a control signal.

4. The control and protection module according to claim 1, wherein:
   the processing unit is configured to suppress the control signal from the electromagnet when a connection fault is detected between the electronic protection device and the trip mechanism.

5. The control and protection module according to claim 1, wherein:
   when a thermal fault is detected, the processing unit is capable of suppressing the control signal from the electromagnet without sending the trip signal from the trip device.

6. The control and protection module according to claim 1, wherein:
   the electronic board is laid out in such a way as to directly accommodate the current sensors, the control terminal block and operator communication means situated on a front side of the casing.

7. The control and protection module according to claim 6, wherein:
   the electronic board is set out in such a way as to directly accommodate a communication connector enabling the control and protection module to communicate with an auxiliary block of the switch device.

8. The control and protection module according to claim 6, wherein:
   the operator communication means includes a selection unit of a unique parameter setting ($I_R$) and by the fact that the processing unit has calculation means to determine, by way of said parameter setting ($I_R$), a thermal fault trip threshold value and a magnetic fault trip threshold value.

9. The control and protection module according to claim 1, wherein:
   the current sensors are connected in series with the current lines of the connector base by a power supply terminal, and
   the control terminal block and the power supply terminal are facing towards the back of the housing in the same direction (X) which corresponds to the insertion and removal axis of the module in the connector base of the switch device.

10. The control and protection module according to claim 9, wherein:
    when the control and protection unit is disconnected from the connector base of the switch device, the control terminal is disconnected from the connector base before the power supply terminal.

11. The control and protection module according to claim 1, wherein:
    the electronic control device is configured to receive from the connector base an identification signal from the electromagnet via the control terminal block.

12. The control and protection module according to claim 11, wherein:
    the electronic control device is configured to use the identification signal to adapt the strength of the current sent for controlling the electromagnet.

13. A multipolar switching device designed to control and protect an electronic charge, comprising a base unit which accommodates current lines fitted with fixed and moving contacts, a control electromagnet and a trip mechanism capable of acting upon the said moving contacts, wherein:
    the connector base is connected in a detachable way to a control and protection module according to one of the preceding claims.

14. The control and protection module according to claim 1, wherein:
    the control electromagnet is a monostable type;
    the trip device is a bistable type; and
    when a current circulates in a coil of the trip device, the trip device triggers an opening of the moving contacts.

15. The control and protection module according to claim 14, wherein:
    the trip device triggers an opening of the moving contacts regardless of a state of the control electromagnet.

16. The control and protection module according to claim 3, wherein:
    the control electromagnet is a monostable type;
    the trip device is a bistable type; and
    when a current circulates in a coil of the trip device, the trip device triggers an opening of the moving contacts.

17. The control and protection module according to claim 16, wherein:
    the trip device triggers an opening of the moving contacts regardless of a state of the control electromagnet.

18. The control and protection module according to claim 6, wherein:
    the current sensors are inserted perpendicularly to the electronic board via two teeth soldered onto the electronic board.

19. The control and protection module according to claim 8, wherein:
    the thermal fault trip threshold value is determined by a cumulative curve giving a trip time in proportion to a current.

20. The control and protection module according to claim 8, wherein:
 the magnetic fault trip threshold value corresponds to fifteen times said parameter setting; and
 a magnetic fault is detected when the magnetic fault trip threshold value has been exceeded for at least 100 ms.

* * * * *